H. Schwandt.
Spur.
No. 111,880. Patented Feb. 14, 1871.
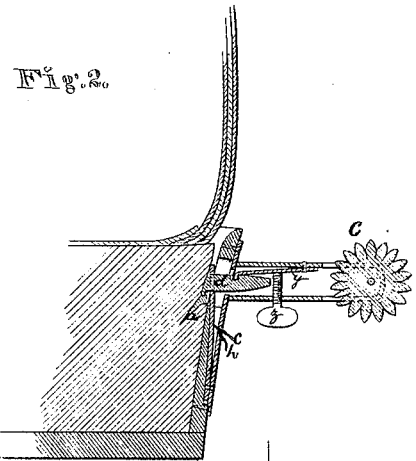
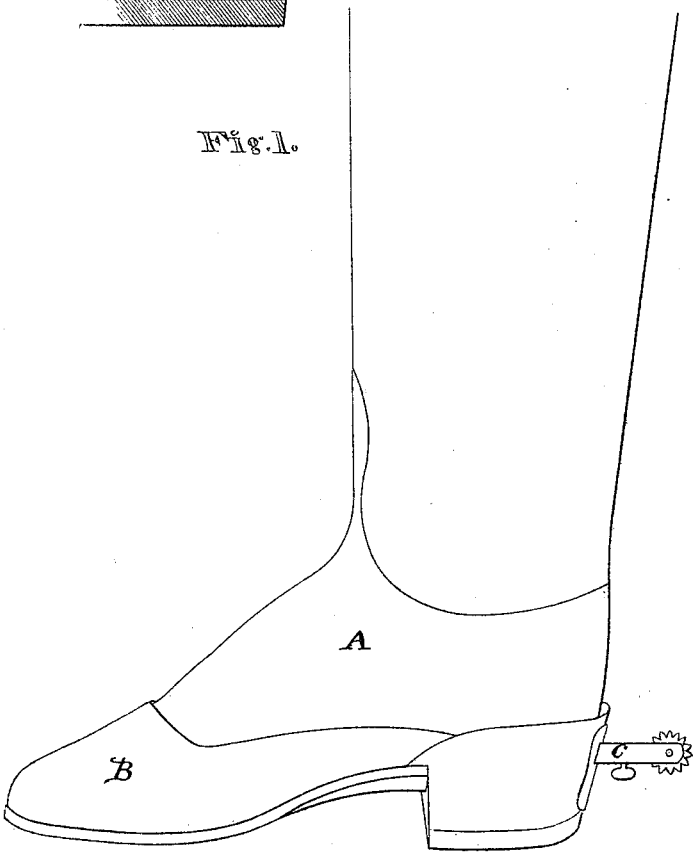
Witnesses
Chas. Kenyon
Villette Anderson.
Inventor.
Henry Schwandt
Chipman. Hosmer &
Attorneys

United States Patent Office.

HENRY SCHWANDT, OF NEW ORLEANS, LOUISIANA.

Letters Patent No. 111,880, dated February 14, 1871.

IMPROVEMENT IN SPUR-ATTACHMENTS TO OVERSHOES.

The Schedule referred to in these Letters Patent and making part of the same.

*To all whom it may concern:*

Be it known that I, HENRY SCHWANDT, of New Orleans, in the parish of Orleans and State of Louisiana, have invented a new and valuable Improvement in Combined Overshoes and Spur; and I do hereby declare that the following is a full, clear, and exact description of the construction and operation of the same, reference being had to the annexed drawing making a part of this specification, and to the letters and figures of reference marked thereon.

My invention relates to means for fastening overshoes to boots or shoes, and consists in a novel combination of a horseman's removable spur with such fastening.

A of the drawing represents a boot;

B, an overshoe; and

C, a removable spur.

In the rear side of the boot-heel I make a small aperture and place on the lower side thereof a plate, $a$, and on the rear side of the overshoe I attach a plate, $c$, and a spring, $h$.

The letter $d$ represents a dog or catch, arranged in the plate $c$, as shown, and which, in conjunction with the plate, spring, and aperture above mentioned, serves to hold the heel of the overshoe in place upon the heel of the boot.

The shank of the spur is made hollow from end to end, and a spring, $y$, having a hook on its head, is arranged therein, as shown.

I also affix a thumb-screw, $z$, to said shank, and make a notch in the rear end of catch $d$.

By these means the spur is made attachable or removable, at will.

To release the overshoe from the boot-heel, I press the catch $d$ rearward, and to remove the spur I turn the thumb-screw until the hook upon spring $y$ is released from the notch in the catch.

I claim as my invention—

The hollow removable spur-shank described, having spring $y$ and thumb-screw $z$, in combination with the catch $d$, when constructed and arranged substantially as and for the purpose specified.

In testimony that I claim the above I have hereunto subscribed my name in the presence of two witnesses.

HENRY SCHWANDT.

Witnesses:
CHRISTIAN FREDERICK HUFFT,
JOSEPH TORRES.